United States Patent
Shirochi et al.

(10) Patent No.: US 7,088,478 B2
(45) Date of Patent: Aug. 8, 2006

(54) CHROMATICITY CONVERSION DEVICE AND CHROMATICITY CONVERSION METHOD

(75) Inventors: Yoshiki Shirochi, Chiba (JP); Hiroaki Endo, Kanagawa (JP)

(73) Assignee: Sony Corporation (JP)

( * ) Notice: Subject to any disclaimer, the term of this patent is extended or adjusted under 35 U.S.C. 154(b) by 999 days.

(21) Appl. No.: 10/059,794

(22) Filed: Jan. 29, 2002

(65) Prior Publication Data

US 2002/0135828 A1    Sep. 26, 2002

(30) Foreign Application Priority Data

Jan. 30, 2001    (JP)    ............ P2001-021082

(51) Int. Cl.
*G03F 3/08*    (2006.01)

(52) U.S. Cl. ............ 358/519; 358/518; 358/521; 345/87; 345/644; 345/88; 345/690; 382/167; 382/274

(58) Field of Classification Search ............ 358/518, 358/519, 521; 345/87, 644, 690, 88; 382/167, 382/274

See application file for complete search history.

(56) References Cited

U.S. PATENT DOCUMENTS

| | | | | |
|---|---|---|---|---|
| 5,987,167 A | * | 11/1999 | Inoue | 382/167 |
| 6,160,532 A | * | 12/2000 | Kaburagi et al. | 345/87 |
| 6,700,559 B1 | * | 3/2004 | Tanaka et al. | 345/88 |
| 2002/0180765 A1 | * | 12/2002 | Tanaka et al. | 345/690 |
| 2003/0001810 A1 | * | 1/2003 | Yamaguchi et al. | 345/87 |

FOREIGN PATENT DOCUMENTS

WO    WO 02/07431 A2    1/2002

* cited by examiner

*Primary Examiner*—Mark Wallerson
*Assistant Examiner*—Beniyam Menberu
(74) *Attorney, Agent, or Firm*—Lerner, David, Littenberg, Krumholz & Mentlik, LLP

(57) ABSTRACT

Linear chromaticity conversion is used to perform color reproduction of a liquid crystal display (LCD) compatible with a cathode ray tube (CRT). An inputted signal is subjected to processing similar to processing used in the CRT display. A light source chromaticity conversion processing portion carries out a γ correction to the signal in a γ operation portion by using γ1=γcrt of the same nonlinear characteristics as the CRT, and performs an operation of a chromaticity conversion matrix in a matrix operation portion. An LCD inverse γ correction portion uses γ2 establishing γ_lcd=γlcd/γ2=1 to perform an inverse γ correction to the inputted signal. An LCD γ characteristic operation portion performs a γ correction using γ characteristics of the LCD to the signal inputted from the LCD inverse γ correction portion, outputs a picture signal, and causes an image to be displayed on the LCD.

12 Claims, 10 Drawing Sheets

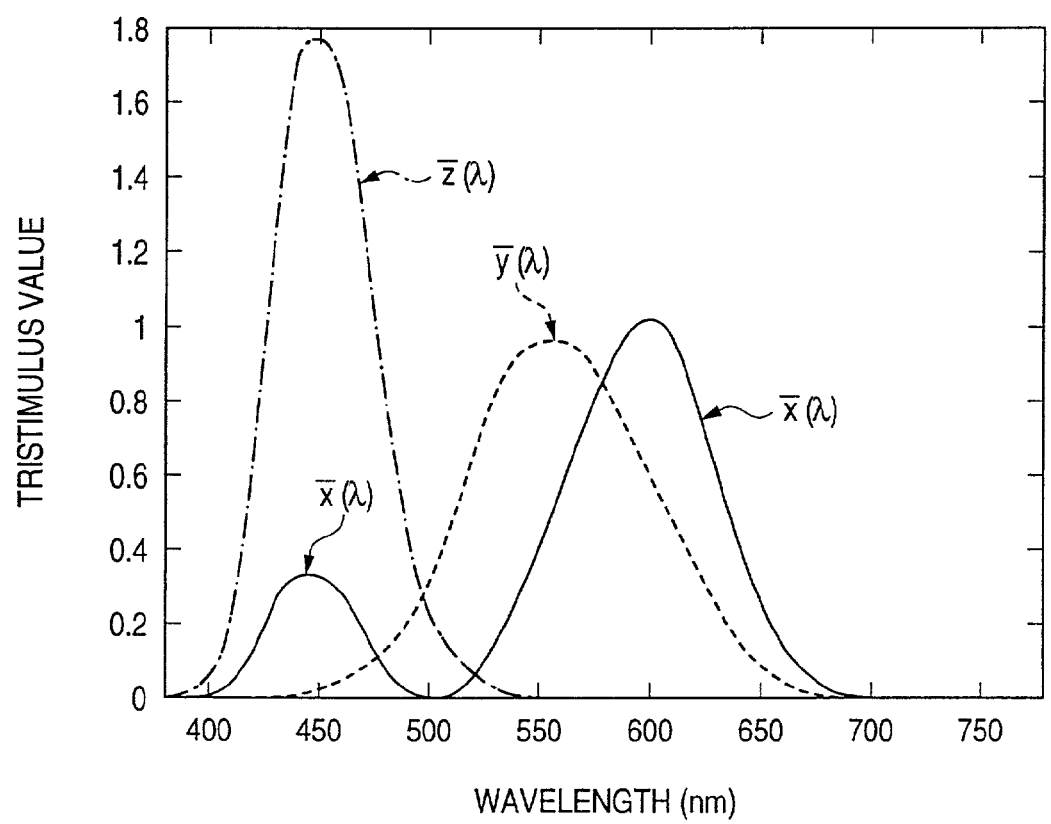

FIG. 3A

|   | R  | G  | B  | W  |
|---|----|----|----|----|
| x | xr | xg | xb | xw |
| y | yr | yg | yb | yw |
| Y | Yr | Yg | Yb | Yw |

FIG. 3B

|   | R    | G    | B    | W     |
|---|------|------|------|-------|
| x | 0.67 | 0.21 | 0.14 | 0.310 |
| y | 0.33 | 0.71 | 0.08 | 0.316 |
| Y | 29.9 | 58.7 | 11.4 | 100   |

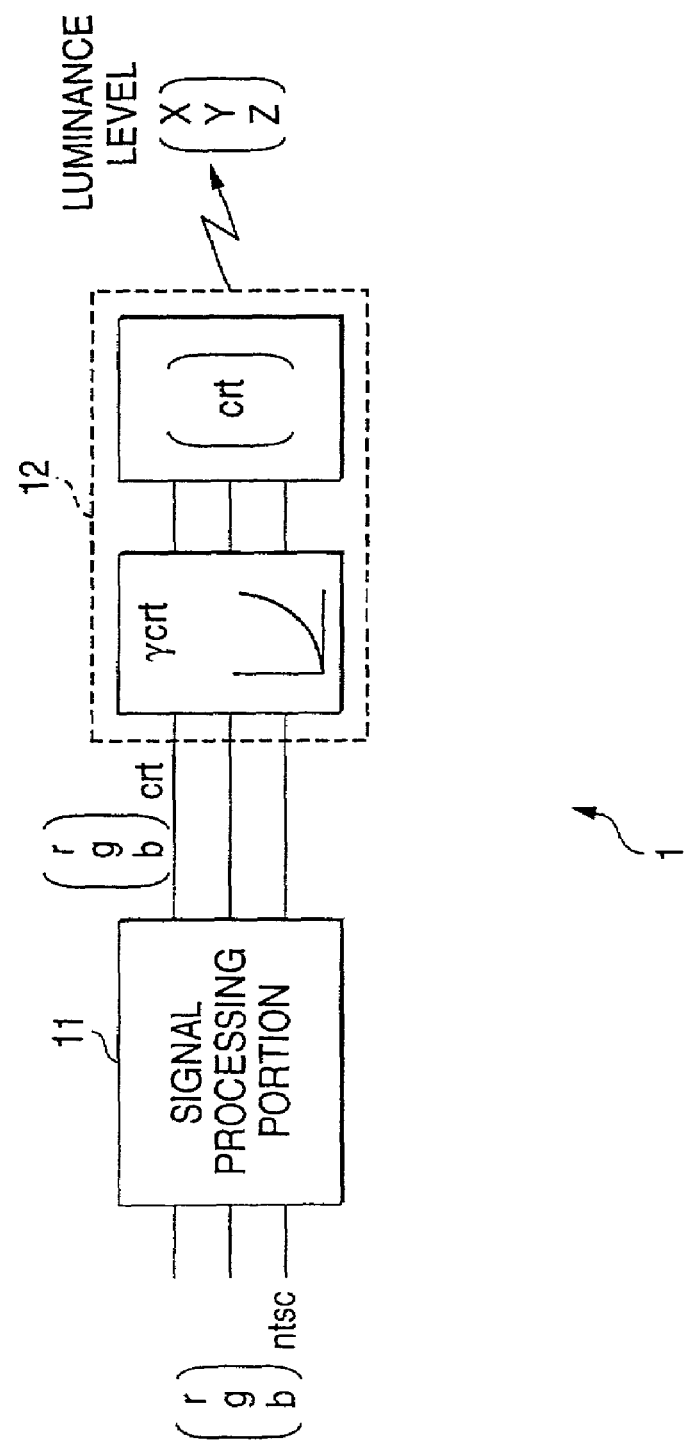

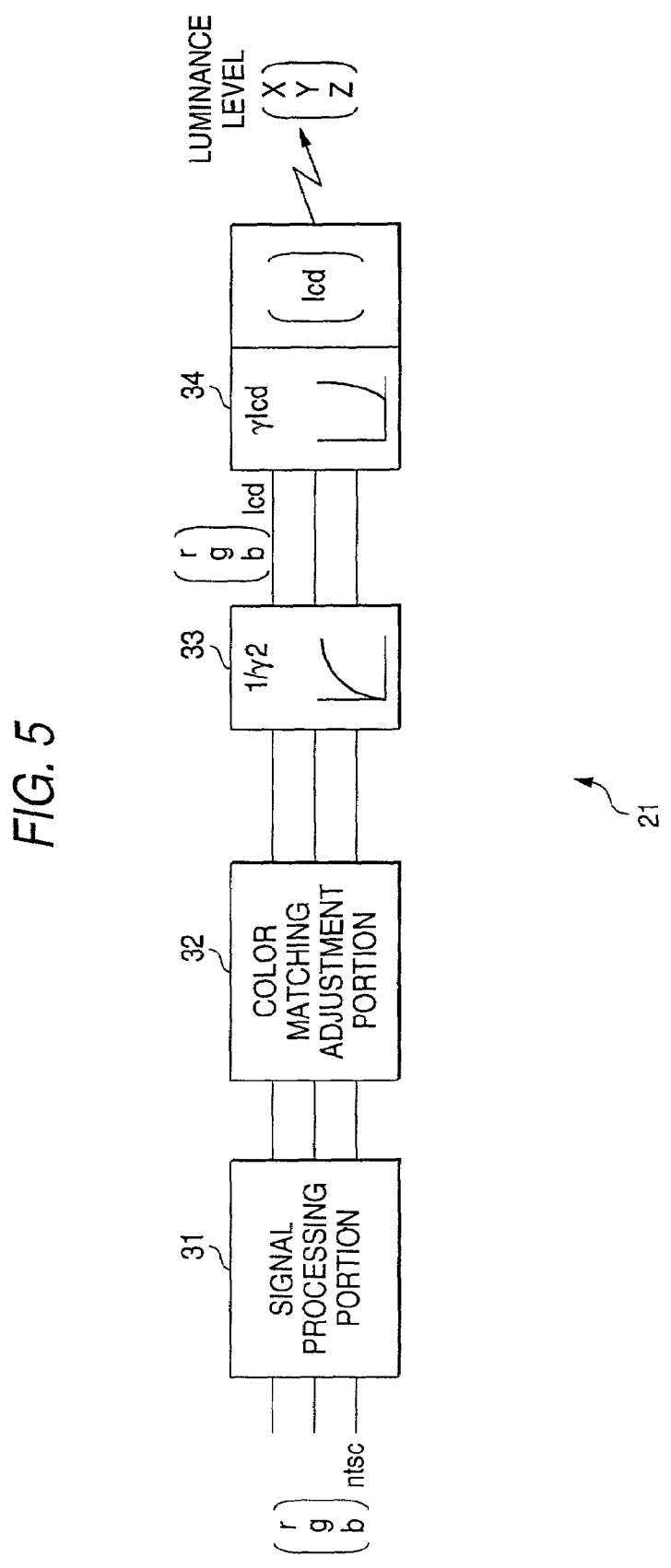

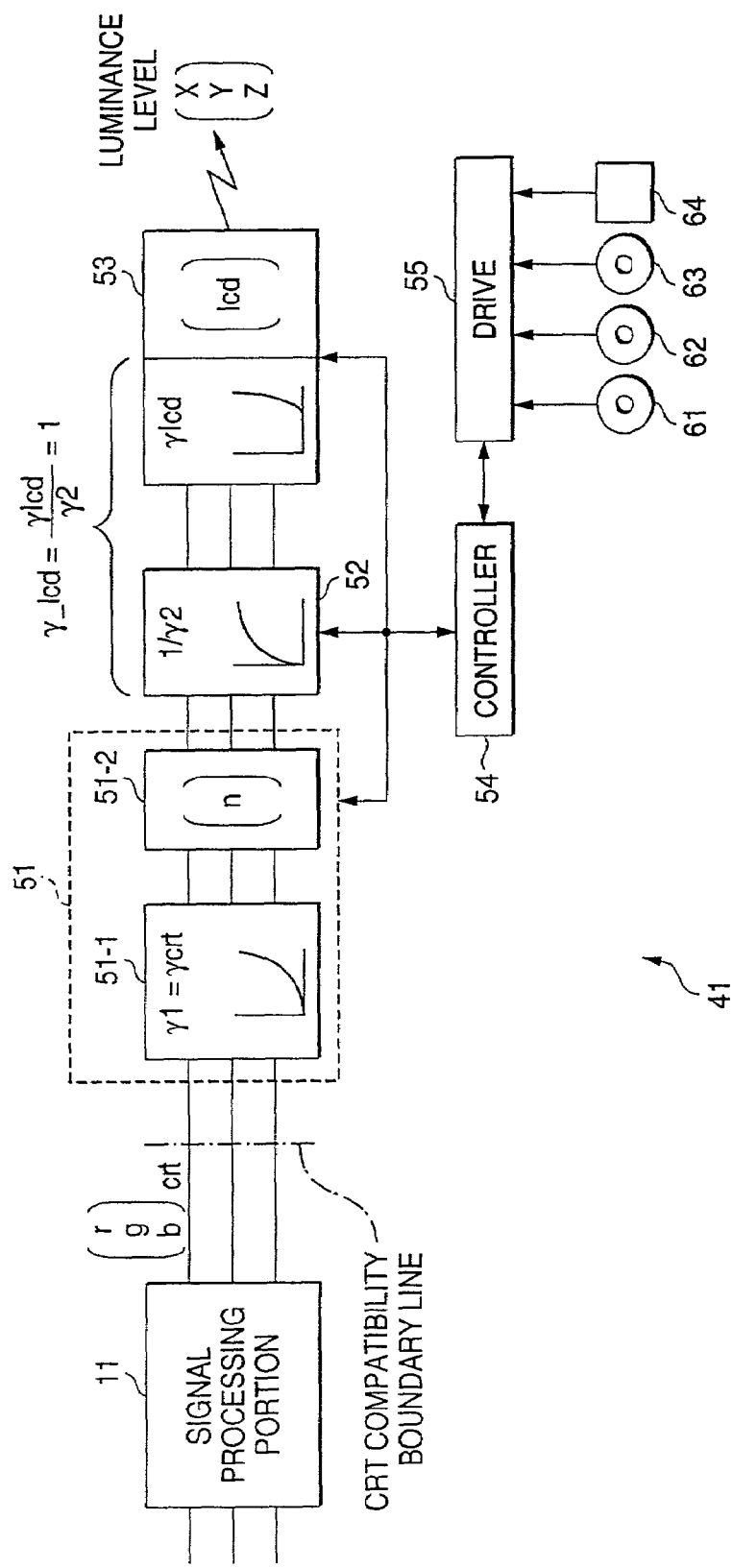

FIG. 9A

|   | R | G | B | W |
|---|---|---|---|---|
| x | 0.625 | 0.28 | 0.155 | 0.279 |
| y | 0.34 | 0.595 | 0.07 | 0.309 |
| Y | 18.2 | 71.3 | 10.5 | 100 |

FIG. 9B

|   | R | G | B | W |
|---|---|---|---|---|
| x | 0.652 | 0.268 | 0.141 | 0.279 |
| y | 0.348 | 0.701 | 0.061 | 0.309 |
| Y | 22.0 | 68.0 | 10.0 | 100 |

CHROMATICITY CONVERSION DEVICE AND CHROMATICITY CONVERSION METHOD

BACKGROUND OF THE INVENTION

1. Field of the Invention

The present invention relates to a chromaticity conversion device which can realize color reproduction compatible with a display device different in light source chromaticity and gradation characteristics, a chromaticity conversion method, a display device, a display method, a recording medium, and a program.

2. Description of the Related Art

Colorimetry information obtained from image data displayed on a color video camera, a color scanner, a projector or the like is often indicated as values of RGB. Here, R denotes red, G denotes green, and B denotes blue, and as reference colors (called original stimuli or basic stimuli), monochromatic light of 700 nm is used for red, monochromatic light of 546.1 nm is used for green, and monochromatic light of 435.8 nm is used for blue.

In modern chromatics, the basis of psychophysical expression of color is a color matching function (Color Matching Functions) modeled on spectral characteristics of a standard colorimetric observer (CIE 1931 Standard Colorimetric Observer). The color matching functions indirectly express the sensitivity of a human eye.

FIG. 1 shows the color matching functions using an RGB color coordinate system. As shown in FIG. 1, in the case where the RGB color coordinate system is used, minus values appear in tristimulus values. Besides, in the RGB color coordinate system, since luminance must be calculated using the tristimulus values of each of RGB, the comparison of the luminance has been difficult.

Then, an XYZ color coordinate system is widely used. Information of an object color received by the standard observer is numerically expressed by definite integrals expressed by expressions (1), (2) and (3). FIG. 2 shows color matching functions using the XYZ color coordinate system. As shown in FIG. 2, in the case where the XYZ color coordinate system is used, tristimulus values do not take a minus value.

[Numerical Formula 1]

$$X = k\int_{vis} \phi(\lambda) \cdot \bar{x}(\lambda) d\lambda \qquad (1)$$

[Numerical Formula 2]

$$Y = k\int_{vis} \phi(\lambda) \cdot \bar{y}(\lambda) d\lambda \qquad (2)$$

[Numerical Formula 3]

$$Z = k\int_{vis} \phi(\lambda) \cdot \bar{z}(\lambda) d\lambda \qquad (3)$$

Where, k is a constant and is expressed by expression (4). Besides, in the expressions (1) to (3), the integration is performed in a visible wavelength region (380 nm to 780 nm). Besides, $\phi(\lambda)$ is expressed by $\phi(\lambda) = R(\lambda) \times P(\lambda)$ for a reflecting object, and is expressed by $\phi(\lambda) = T(\lambda) \times P(\lambda)$ for a transparent object. Where, $P(\lambda)$ is a spectral distribution of illumination light, $R(\lambda)$ is spectral reflectivity of the reflecting object, and $T(\lambda)$ is spectral transmissivity of the transparent object.

[Numerical Formula 4]

$$k = \frac{100}{\int_{vis} P(\lambda) \cdot \bar{y}(\lambda) d\lambda} \qquad (4)$$

Although X, Y and Z basically denote intensities of color lights of red, green and blue, they denote colors (imaginary colors) which do not actually exist. X denotes a color close to red having no brightness, Z denotes a color close to blue having no brightness, and Y denotes a color close to green having brightness. That is, only the Y value has brightness.

An xy color coordinate system is a method for expressing a color (color is expressed by chromaticity coordinates x and y) by mapping into a two-dimensional space in accordance with the following expressions (5) and (6) using the tristimulus values XYZ of colors.

$$x = X/(X+Y+Z) \qquad (5)$$

$$y = Y/(X+Y+Z) \qquad (6)$$

In the case where z corresponding to Z of the tristimulus values XYZ of colors is considered, the following expression (7) is established.

$$z = Z/(X+Y+Z) = 1-x-y \qquad (7)$$

As expressed in the following expressions (8) to (11), RGBW (W denotes white) can be expressed by using the tristimulus values XYZ.

[Numerical Formula 5]

$$\bar{R} = Xr\bar{X} + Yr\bar{Y} + Zr\bar{Z} \qquad (8)$$

[Numerical Formula 6]

$$\bar{G} = Xg\bar{X} + Yg\bar{Y} + Zg\bar{Z} \qquad (9)$$

[Numerical Formula 7]

$$\bar{B} = Xb\bar{X} + Yb\bar{Y} + Zb\bar{Z} \qquad (10)$$

[Numerical Formula 8]

$$\begin{aligned} W &= \bar{R} + \bar{G} + \bar{B} \\ &= Xw\bar{X} + Yw\bar{Y} + Zw\bar{Z} \end{aligned} \qquad (11)$$

Here, from the foregoing expressions (5) to (7), the following expressions (12) and (13) are established.

$$X = Y(x/y) \qquad (12)$$

$$Z = Y(z/y) \qquad (13)$$

Accordingly, from the expressions (8) to (13), the following expressions (14) to (16) can be obtained.

$$\begin{aligned} Xw &= Xr + Xg + Xb \\ &= xr(Yr/yr) + xg(Yg/yg) + xb(Yb/yb) \end{aligned} \qquad (14)$$

$$Yw = Yr + Yg + Yb \qquad (15)$$

-continued $$Zw = Zr + Zg + Zb \quad (16)$$
$$= zr(Yr/yr) + zg(Yg/yg) + zb(Yb/yb)$$
$$= (1 - xr - yr)(Yr/yr) + (1 - xg - yg)(Yg/yg) +$$
$$(1 - xb - yb)(Yb/yb)$$
$$= (Yr/yr + Yg/yg + Yb/yb) -$$
$$\{xr(Yr/yr) + xg(Yg/yg) + xb(Yb/yb)\} -$$
$$(Yr + Yg + Yb)$$
$$= Yr/yr + Yg/yg + Yb/yb - Xw - Yw$$

Besides, the following expressions (17) and (18) are established.

$$Xw = xw(Yw/yw) \quad (17)$$

$$Zw = (1 - xw - yw)(Yw/yw) \quad (18)$$
$$= Yw/yw - Xw - Yw$$

Accordingly, expression (19) is obtained from the expression (14) and the expression (17), and expression (20) is obtained from the expression (16) and the expression (18).

$$xw(Yw/yw) = xr(Yr/yr) + xg(Yg/yg) + xb(Yb/yb) \quad (19)$$

$$Yw/yw = Yr/yr + Yg/yg + Yb/yb \quad (20)$$

Then, from the expressions (15), (19) and (20), Yr, Yg and Yb can be obtained as expressed by the following expressions (21) to (23)

[Numerical Formula 9]

$$Yr = -\frac{Yw \cdot yr(xw \cdot yb - xg \cdot yb - xb \cdot yw + xg \cdot yw + xb \cdot yg - xw \cdot yg)}{yw(xg \cdot yb - xr \cdot yb - xb \cdot yg + xr \cdot yg + xb \cdot yr - xg \cdot yr)} \quad (21)$$

[Numerical Formula 10]

$$Yg = -\frac{Yw \cdot yg(-xw \cdot yb + xr \cdot yb + xb \cdot yw - xr \cdot yw - xb \cdot yr + xw \cdot yr)}{yw(xg \cdot yb - xr \cdot yb - xb \cdot yg + xr \cdot yg + xb \cdot yr - xg \cdot yr)} \quad (22)$$

[Numerical Formula 11]

$$Yb = \frac{Yw \cdot ybg(xg \cdot yw - xr \cdot yw - xw \cdot yg + xr \cdot yg + xw \cdot y - xg \cdot yr)}{yw(xg \cdot yb - xr \cdot yb - xb \cdot yg + xr \cdot yg + xb \cdot yr - xg \cdot yr)} \quad (23)$$

As typical color television systems, there are three systems of NTSC (National TV Standards Committee), PAL (Phase Alternating Line), and SECAM (Sequential Color And Memory). With respect to calorimetric parameters, constants peculiar to the respective systems are determined.

For example, in the NTSC system, since a transmitted signal is compressed at a transmission side, it has nonlinear gamma ($\gamma$) characteristics. Since the following expression (24) is established at the transmission side, the transmitted signal is expressed by expression (25).

[Numerical Formula 12]

$$\begin{pmatrix} R \\ G \\ B \end{pmatrix}_{ntsc} = (ntsc)^{-1} \begin{pmatrix} X \\ Y \\ Z \end{pmatrix}_{ntsc} \quad (24)$$

[Numerical Formula 13]

$$\begin{pmatrix} r \\ g \\ b \end{pmatrix}_{ntsc} = \begin{pmatrix} R \\ G \\ B \end{pmatrix}_{ntsc}^{\frac{1}{\gamma ntsc}} = \left( (ntsc)^{-1} \begin{pmatrix} X \\ Y \\ Z \end{pmatrix}_{ntsc} \right)^{\frac{1}{\gamma ntsc}} \quad (25)$$

Here, the matrix (ntsc) is a transformation matrix of three rows and three columns in the NTSC system.

Here, when respective elements of the transformation matrix of three rows and three columns are made {a11, a12, a13, a21, a22, a23, a31, a32, a33}, the respective elements are expressed by the following expressions (26) to (34), and XYZ can be expressed by the following expressions (35) to (37), respectively.

$$a11 = (xr*Yr)/(yr*Yw) \quad (26)$$

$$a12 = (xg*Yg)/(yg*Yw) \quad (27)$$

$$a13 = (xb*Yb)/(yb*Yw) \quad (28)$$

$$a21 = Yr/Yw \quad (29)$$

$$a22 = Yg/Yw \quad (30)$$

$$a23 = Yb/Yw \quad (31)$$

$$a31 = \{(1-xr-yr)*Yr\}/(yr*Yw) \quad (32)$$

$$a32 = \{(1-xg-yg)*Yg\}/(yg*Yw) \quad (33)$$

$$a33 = \{(1-xb-yb)*Yb\}/(yb*Yw) \quad (34)$$

$$X = (a11*R + a12*G + a13*B)*Yw/255 \quad (35)$$

$$Y = (a21*R + a22*G + a23*B)*Yw/255 \quad (36)$$

$$Z = (a31*R + a32*G + a33*B)*Yw/255 \quad (37)$$

Besides, when the respective elements of an inverse matrix of the matrix expressed by the expressions (26) to (34) are made {b11, b12, b13, b21, b22, b23, b31, b32, b33}, the respective elements are expressed by the following expressions (38) to (46)

$$b11 = (-a23*a32 + a22*a33)/\alpha \quad (38)$$

$$b12 = (a13*a32 - a12*a33)/\alpha \quad (39)$$

$$b13 = (-a13*a22 + a12*a23)/\alpha \quad (40)$$

$$b21 = (a23*a31 - a21*a33)/\alpha \quad (41)$$

$$b22 = (-a13*a31 + a11*a33)/\alpha \quad (42)$$

$$b23 = (a13*a21 - a11*a23)/\alpha \quad (43)$$

$$b31 = (-a22*a31 + a21*a32)/\alpha \quad (44)$$

$$b32=(a12*a31-a11*a32)/\alpha \quad (45)$$

$$b33=(-a12*a21+a11*a22)/\alpha \quad (46)$$

Where, $\alpha$ in the expressions (38) to (46) is a value expressed by the following expression (47).

$$\alpha = -a13*a22*a31 + a12*a23*a31 + a13*a21*a32 - a11*a23*a32 - a12*a21*a33 + a11*a22*a33 \quad (47)$$

FIG. 3A shows the relation between light source chromaticity points and names of variables, and FIG. 3B shows light source chromaticity points in the linear NTSC. In accordance with the names of the variables shown in FIG. 3A, the values of the light source chromaticity points in the linear NTSC shown in FIG. 3B are substituted for the expressions (26) to (34), so that the transformation matrix (ntsc) can be obtained.

[Numerical Formula 14]

$$(ntsc) = \begin{pmatrix} 0.607 & 0.174 & 0.200 \\ 0.299 & 0.587 & 0.114 \\ 0.000 & 0.066 & 1.116 \end{pmatrix} \quad (48)$$

It is very difficult to accurately confirm subtle color and brightness of image data, which has been processed by a predetermined system, such as the NTSC system described above, and has been transmitted, on a display at a receiving side. This is because the luminance of a fluorescent material of the display does not intensify in proportion to the intensity of an electron beam but reacts nonlinearly, and this is called nonlinearity of the display. Similarly, the human visual sense nonlinearly reacts to the fluctuation in luminance. In order to make this nonlinearity approach the human vision, a specific color map corresponding to a display to be used is prepared, and a color correction is carried out on the basis of the color map, which is called a gamma ($\gamma$) correction of the display.

There are gamma characteristics peculiar to each display. For example, also in a CRT (Cathode Ray Tube) display, the level of an input signal is not in proportion to (nonlinear) an amount of light emission of a fluorescent material. This is a phenomenon which is caused by the relation between a voltage applied to an electron gun of the CRT and an amount of emitted electrons. If the $\gamma$ characteristics of the displays are not adjusted, the respective hues are changed, so that accurate color reproduction can not be carried out. Then, in the case where an image is displayed on the CRT display, in order to adjust the $\gamma$ characteristics, the gamma correction corresponding to the CRT display is executed.

For example, as shown in FIG. 4, in a CRT nonlinear chromaticity conversion device 1 for displaying an NTSC signal on a not-shown CRT display, an inputted signal is processed by a signal processing portion 11 so that the tints are matched with the CRT display, and the gamma correction corresponding to the CRT display is carried out in a CRT $\gamma$ characteristic operation portion 12. In the receiving side CRT display, the following expressions (49) and expression (50) are established.

[Numerical Formula 15]

$$\begin{pmatrix} X \\ Y \\ Z \end{pmatrix}_{crt} = (crt) \begin{pmatrix} R \\ G \\ B \end{pmatrix}_{crt} \quad (49)$$

[Numerical Formula 16]

$$\begin{pmatrix} R \\ G \\ B \end{pmatrix}_{crt} = \begin{pmatrix} r \\ g \\ b \end{pmatrix}_{crt}^{\gamma crt} \quad (50)$$

Here, the matrix (crt) is a transformation matrix of three rows and three columns in the CRT display.

In order to carry out accurate color reproduction of received signals, the following expression (51) must be satisfied.

[Numerical Formula 17]

$$\begin{pmatrix} X \\ Y \\ Z \end{pmatrix}_{crt} = \begin{pmatrix} X \\ Y \\ Z \end{pmatrix}_{ntsc} \quad (51)$$

Then, since the following expression (52) is derived from the expressions (25), (49) and (50), in the case where signal processing is not carried out, the chromaticity of the CRT is exactly the same as that of regulations, and in the case of $\gamma crt/\gamma ntsc=1$ and $(crt)=(ntsc)$, accurate color reproduction of a received signal is carried out.

[Numerical Formula 18]

$$\begin{pmatrix} X \\ Y \\ Z \end{pmatrix}_{crt} = (crt) \begin{pmatrix} R \\ G \\ B \end{pmatrix}_{crt}$$

$$= (crt) \begin{pmatrix} r \\ g \\ b \end{pmatrix}_{crt}^{\gamma crt}$$

$$= (crt) \left( (ntsc)^{-1} \begin{pmatrix} X \\ Y \\ Z \end{pmatrix}_{ntsc} \right)^{\frac{\gamma crt}{\gamma ntsc}} \quad (52)$$

However, practically, since the chromaticity of the NTSC is different from that of the CRT, (crt)=(ntsc) is not established. Besides, since there is an influence of signal processing for desirable picture quality formation at the receiving side, the $\gamma$ characteristics at the transmission side and the reception side do not coincide with each other. Accordingly, for the color reproduction, a picture quality adjustment is carried out at the transmission side while the CRT display is seen, and a correction is carried out at the reception side, for example, RGB vector axes are shifted, so that the tints are matched with each other.

Next, a case in which the NTSC signal is displayed on, for example, an LCD (Liquid Crystal Display), not the CRT display, will be considered. The $\gamma$ characteristics of the CRT display are different from the $\gamma$ characteristics of the LCD. Since the processing relative to the CRT display is already established as a defect standard from the circumstances until now, a newcome display device must carry out the chromaticity conversion in accordance with the tints of the CRT.

FIG. 5 is a block diagram showing a structure of a conventional LCD nonlinear chromaticity conversion device 21 for displaying an NTSC signal on an LCD.

The inputted NTSC signal is subjected to a picture formation processing peculiar to the LCD, which is different from the processing carried out in the signal processing portion 11 explained by use of FIG. 4, in a signal processing portion 31. Then, in a color matching adjustment portion 32, the LCD light source chromaticity is made to approach the CRT light source chromaticity to the utmost, and the phases and levels of R-Y/G-Y vector axes are adjusted, so that a color divergence about which a user feels uneasy is adjusted in a natural picture. The color matching adjustment carried out here includes, for example, one in which vector axes for improving the color matching accuracy are made six axes in total, including magenta, cyan and yellow in addition to RGB and each of them is made adjustable, and one in which respective vector axes are made adjustable for every luminance level.

The signal subjected to the color matching is subjected to the inverse γ correction by 1/γ2 in an LCD inverse γ correction portion 33, and is subjected to the γ correction (γlcd) of the LCD in an LCD γ characteristic operation portion 34, and a generated picture signal of a luminance level (X, Y, Z) is outputted to a not-shown LCD and is displayed. Here, the relation among γ2 as they characteristics used for the inverse γ correction, γlcd as the γ characteristics used for the γ correction of the LCD, and γcrt as the γ characteristics of the CRT display as an object is expressed by the following expression (53).

$$\gamma lcd/\gamma 2 = \gamma crt \qquad (53)$$

FIG. 6A shows the composite γ characteristics (that is, γ characteristics γcrt=2.5 of the CRT display) and the γ characteristics γlcd of the LCD. In order to adjust the difference of the gamma characteristics, the inverse γ correction is carried out in the LCD inverse γ correction portion 33. The inverse γ characteristics (1/γ2) in this case is shown in FIG. 6B.

However, in a nonlinear chromaticity conversion device, even if the γ characteristics are matched by using the foregoing method, if the light source chromaticity of each display does not coincide with each other, it is difficult to match colors seen by the use.

As measures against that, for example, there is a method in which not only the γ characteristics but also the light source chromaticity is also matched with the CRT display. However, in this case, exactly the same light source is required. Besides, there is a method in which after an input signal is returned linearly, chromaticity conversion is carried out, and then, the γ characteristics are matched by using a γ conversion circuit having the same characteristics as the CRT display. However, in this case, a color reproduction range becomes different. Further, although there is a method in which chromaticity conversion including a level as well is carried out, in that case, the processing becomes very complicated.

In any of the above measures, since the processing for matching the characteristics of a signal is carried out at the input side, it is necessary to carry out a processing for returning the characteristics of the signal according to the signal at the transmission side. Since the signal processing is carried out after the processing is ended, the signal conversion becomes very complicated.

The present invention has been made in view of such circumstances, and enables color reproduction compatible with a CRT at any signal levels by using simple linear chromaticity conversion.

SUMMARY OF THE INVENTION

A chromaticity conversion device of the present invention is characterized by comprising first operation means for executing an operation of a gradation correction by using the same gradation characteristics as a first display portion, second operation means for executing a linear matrix operation for chromaticity conversion, and third operation means for executing an operation for linearly converting gradation characteristics of a second display portion.

The third operation means can be provided with first correction means for executing an inverse gamma correction in accordance with first gamma characteristics and second correction means for executing a gamma correction in accordance with second gamma characteristics, the second gamma characteristics can be made gamma characteristics of the second display portion, and the first gamma characteristics can be determined so that a combination of the inverse gamma correction by the first correction means and the gamma correction by the second correction means becomes linear.

The first display portion can be made a CRT display, and the second display portion can be made a liquid crystal display.

The second operation means can be made to execute the matrix operation using a matrix product of an inverse matrix of a transformation matrix corresponding to the second display portion and a transformation matrix corresponding to the first display portion.

A chromaticity conversion method of the present invention is characterized by comprising a first operation step of executing an operation of a gradation correction by using the same gradation characteristics as a first display portion, a second operation step of executing a linear matrix operation for chromaticity conversion, and a third operation step of executing an operation for linearly converting gradation characteristics of a second display portion.

A program recorded on a first recording medium of the present invention is characterized by comprising a first operation step of executing an operation of a gradation correction by using the same gradation characteristics as a first display portion, a second operation step of executing a linear matrix operation for chromaticity conversion, and a third operation step of executing an operation for linearly converting gradation characteristics of a second display portion.

A first program of the present invention is characterized by comprising a first operation step of executing an operation of a gradation correction by using the same gradation characteristics as a first display portion, a second operation step of executing a linear matrix operation for chromaticity conversion, and a third operation step of executing an operation for linearly converting gradation characteristics of a second display portion.

A display device of the present invention comprises signal processing means for executing a similar signal processing to a case where image data is displayed on another display portion, chromaticity conversion means for executing chromaticity conversion of a signal corresponding to the image data subjected to the signal processing by the signal processing means, and display control means for controlling display of the image data having chromaticity, which has been converted by the chromaticity conversion means, on a display portion, wherein the chromaticity conversion means comprises first operation means for executing an operation of a gradation correction by using the same gradation characteristics as the other display portion, second operation means for executing a linear matrix operation for chromaticity conversion, and third operation means for executing an operation for linearly converting gradation characteristics of the display portion.

The third operation means can be provided with first correction means for executing an inverse gamma correction in accordance with first gamma characteristics and second correction means for executing a gamma correction in accordance with second gamma characteristics, the second gamma characteristics can be made gamma characteristics of the display portion, and the first gamma characteristics can be determined so that a combination of the inverse gamma correction by the first correction means and the gamma correction by the second correction means becomes linear.

The display portion can be made a liquid crystal display, and the other display portion can be made a CRT display.

The second operation means can be made to execute the matrix operation by using a matrix product of an inverse matrix of a transformation matrix corresponding to the display portion and a transformation matrix corresponding to the other display portion.

BRIEF DESCRIPTION OF THE DRAWINGS

FIG. 2 is a view for explaining color matching functions of an XYZ color coordinate system;

FIGS. 3A and 3B are views for explaining the relation between light source chromaticity points and names of variables, and light source chromaticity points in a linear NTSC;

FIG. 4 is a block diagram showing a structure of a conventional CRT nonlinear chromaticity conversion device;

FIG. 5 is a block diagram showing a structure of a conventional LCD nonlinear chromaticity conversion device;

FIG. 7 is a block diagram showing a structure of an LCD chromaticity conversion device to which the present invention is applied;

FIGS. 9A and 9B are views for explaining chromaticity points of a CRT and an LCD.

DETAILED DESCRIPTION OF THE PREFERRED EMBODIMENTS

Figure 1:
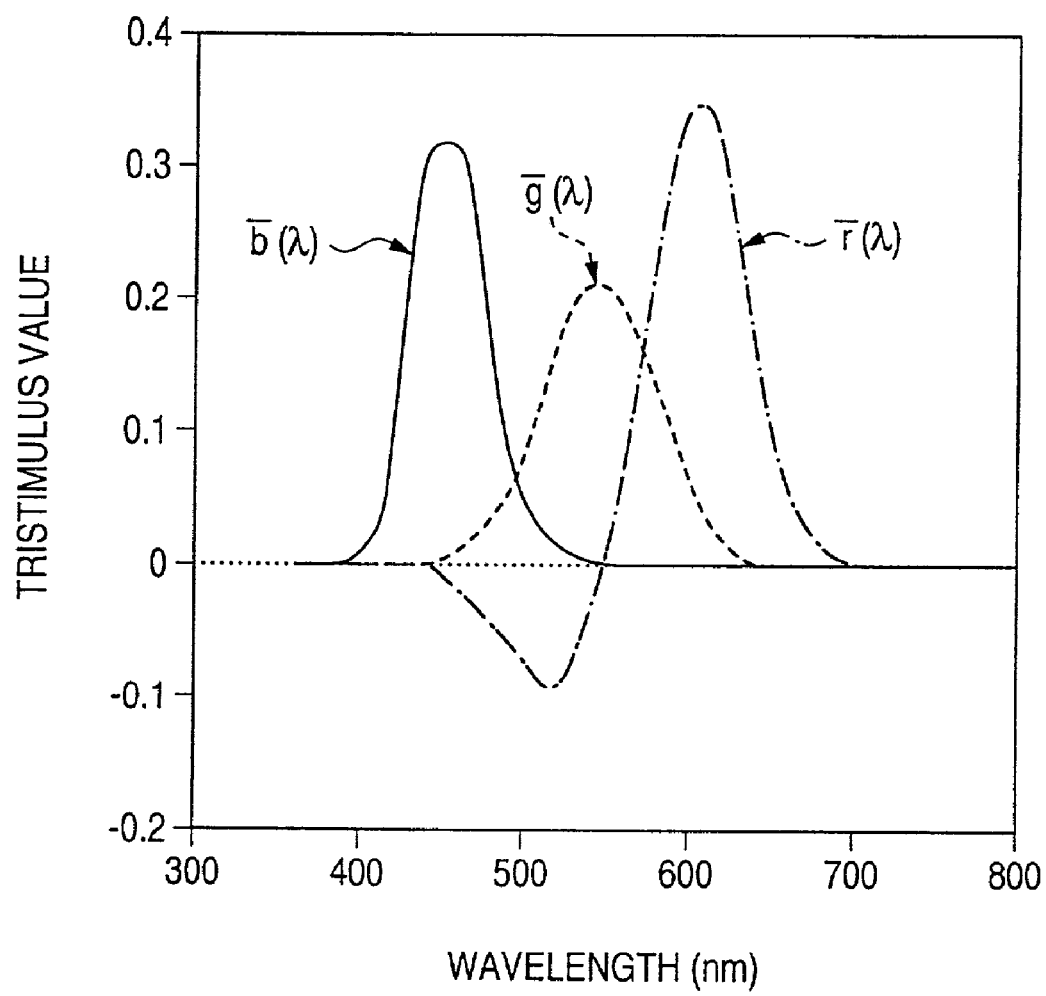
FIG. 1 is a view for explaining color matching functions of an RGB color coordinate system.
Figure 6B:
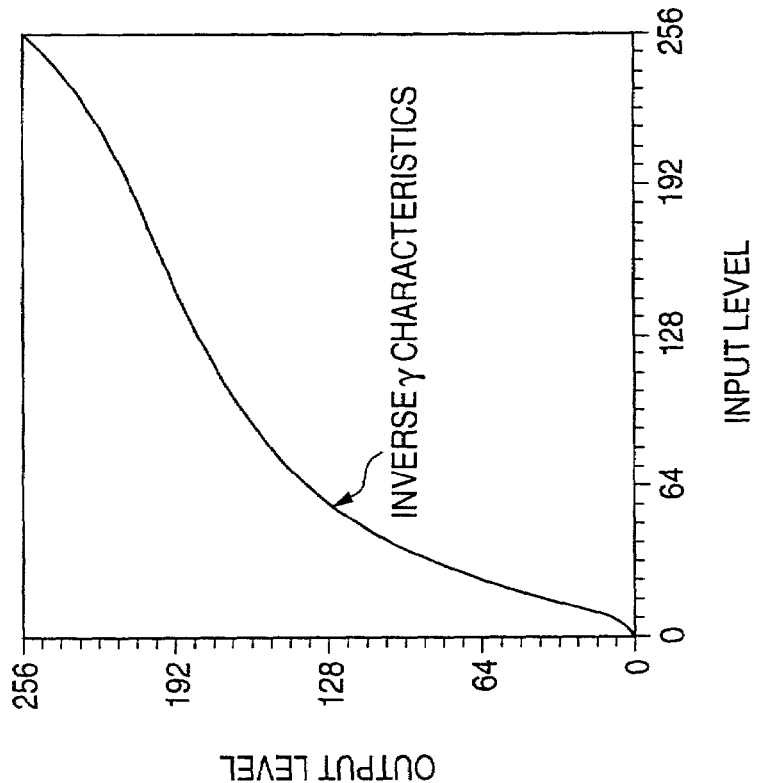
FIGS. 6A and 6B are views for explaining composite γ characteristics, γ characteristics γlcd of an LCD, and inverse γ characteristics in the LCD nonlinear chromaticity conversion device of FIG. 5.
Figure 6A:
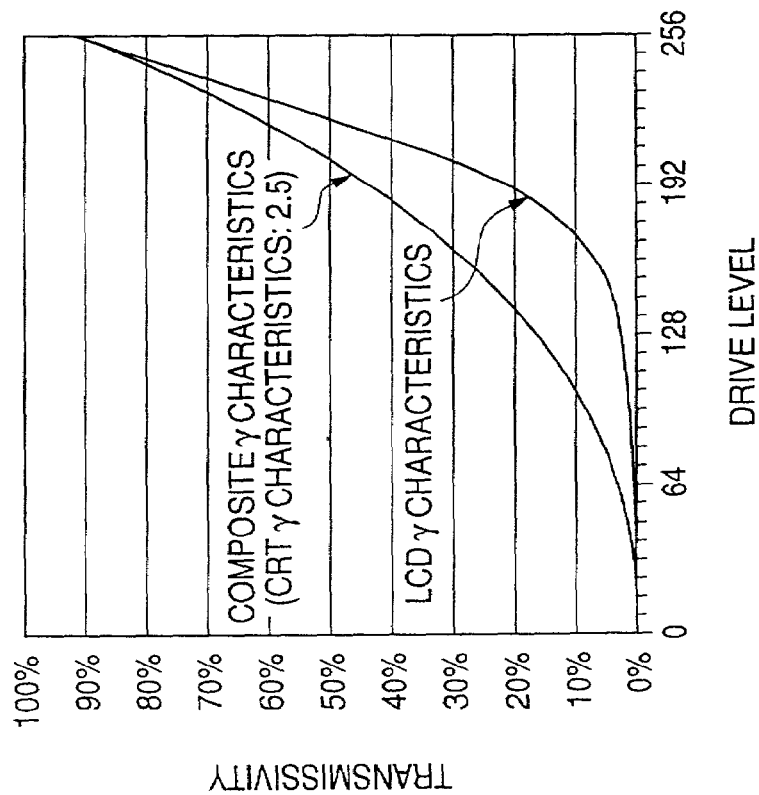

Hereinafter, embodiments of the present invention will be described with reference to the drawings.

FIG. 7 is a block diagram showing a structure of an LCD chromaticity conversion device 41 to which the present invention is applied. The LCD chromaticity conversion device 41 is incorporated in the inside of a display device, for example, a television receiver using an LCD as a display used for displaying, a projector, or the like.

For example, a picture signal received by a not-shown antenna or inputted through a cable or the like is inputted to a signal processing portion 11 which is the same as that explained by using FIG. 4, and the same processing as the conventional case where an image is displayed on the CRT is carried out.

A light source chromaticity conversion processing portion 51 is constituted by a γ operation portion 51-1 and a matrix operation portion 51-2. The light source chromaticity conversion processing portion 51 carries out a γ correction to a signal inputted from the signal processing portion 11 in the γ operation portion 51-1 by using γ1=γcrt which is the same nonlinear characteristic as the CRT, and further, multiplies the signal by a chromaticity conversion matrix (n) of three rows and three columns in the matrix operation portion 51-2.

Here, in the case where the following expressions (54) and (55) are established at a receiving side LCD, in order to make the color reproduction of the CRT display equal to the color reproduction of the LCD, expression (56) must be established.

[Numerical Formula 19]

$$\begin{pmatrix} X \\ Y \\ Z \end{pmatrix}_{lcd} = (lcd) \begin{pmatrix} R \\ G \\ B \end{pmatrix}_{lcd} \quad (54)$$

[Numerical Formula 20]

$$\begin{pmatrix} R \\ G \\ B \end{pmatrix}_{lcd} = \begin{pmatrix} r \\ g \\ b \end{pmatrix}_{lcd}^{\gamma\_lcd} \quad (55)$$

[Numerical Formula 21]

$$(lcd)\begin{pmatrix} r \\ g \\ b \end{pmatrix}_{lcd}^{\gamma\_lcd} = (crt)\begin{pmatrix} r \\ g \\ b \end{pmatrix}_{crt}^{\gamma\_crt} \quad (56)$$

The following expression (57) is derived from the expression (56).

[Numerical Formula 22]

$$\begin{pmatrix} r \\ g \\ b \end{pmatrix}_{lcd}^{\gamma\_lcd} = (lcd)^{-1}(crt)\begin{pmatrix} r \\ g \\ b \end{pmatrix}_{crt}^{\gamma\_crt} \quad (57)$$

When γ_lcd=1 is put in the expression (57), the following expression (58) is established, and a nonlinear element is not contained in the chromaticity transformation matrix (n).

[Numerical Formula 23]

$$\begin{pmatrix} r \\ g \\ b \end{pmatrix}_{lcd} = (n) \begin{pmatrix} r \\ g \\ b \end{pmatrix}_{crt}^{\gamma\_crt} \quad (58)$$

Here, the chromaticity transformation matrix (n) of the expression (58) is a matrix of three rows and three columns, which satisfies the following expression (59).

[Numerical Formula 24]

$$(n) = \begin{pmatrix} n11 & n12 & n13 \\ n21 & n22 & n23 \\ n31 & n32 & n33 \end{pmatrix} = (lcd)^{-1}(crt) \quad (59)$$

Accordingly, an LCD inverse γ correction portion 52 carries out an inverse γ correction to an inputted signal by using γ2 establishing γ_lcd=γlcd/γ2=1.

Figure 8:
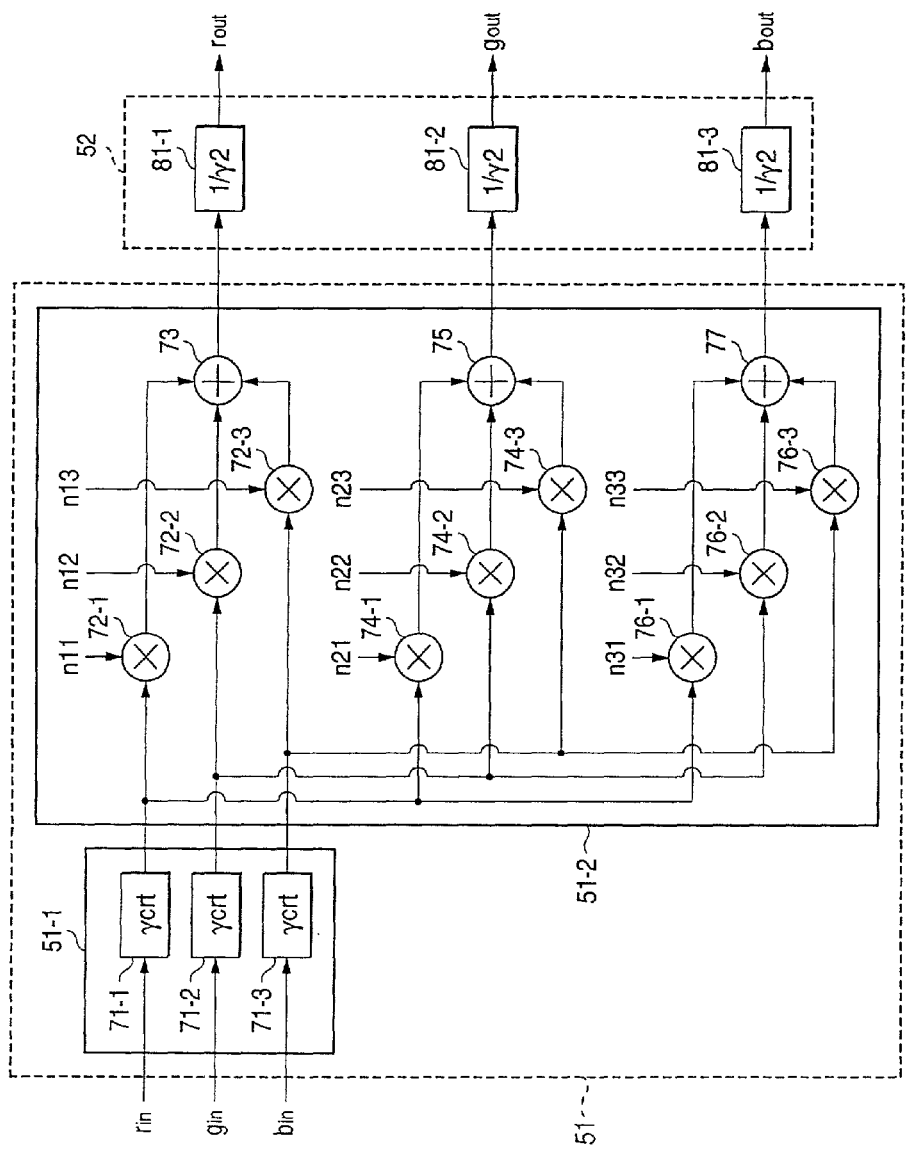
FIG. 8 is a block diagram showing a structure of a light source chromaticity conversion processing portion and an LCD inverse γ correction portion of FIG. 7.

FIG. 8 is a block diagram showing a detailed structure of the light source chromaticity conversion processing portion 51 and the LCD inverse γ correction portion 52.

The light source chromaticity conversion processing portion 51 carries out the γ correction for the respective elements of inputted r, g and b in the γ operation portion 51-1 provided in its inside by γ1=γcrt (nonlinear characteristics similar to the CRT), and multiplies, in the matrix operation portion 51-2, the respective elements, which have been subjected to the γ correction, by the respective elements of the chromaticity conversion matrix (n) of three rows and three columns explained by using the expressions (58) and (59).

Specifically, the respective elements of r, g and b are inputted to a γcrt correction portion 71-1 to a γcrt correction portion 71-3, respectively, and the γ correction is carried out. The output of the γcrt correction portion 71-1 is inputted to a multiplication portion 72-1, a multiplication portion 74-1, and a multiplication portion 76-1, and is multiplied by n11, n21 and n31 of the elements of the chromaticity conversion matrix (n) expressed in the expression (58).

Similarly, the output of the γcrt correction portion 71-2 is inputted to a multiplication portion 72-2, a multiplication portion 74-2, and a multiplication portion 76-2, and is multiplied by n12, n22 and n32, respectively. The output of the γcrt correction portion 71-3 is inputted to a multiplication portion 72-3, a multiplication portion 74-3, and a multiplication portion 76-3, and is multiplied by n13, n23 and n33, respectively.

Then, multiplication results in the multiplication portion 72-1 to the multiplication portion 72-3 are outputted to an addition portion 73 and are respectively added, multiplication results in the multiplication portion 74-1 to the multiplication portion 74-3 are outputted to an addition portion 75 and are respectively added, and multiplication results in the multiplication portion 76-1 to the multiplication portion 76-3 are outputted to an addition portion 77 and are respectively added.

The addition results (operation results by the chromaticity conversion matrix (n)) by the addition portion 73, the addition portion 75 and the addition portion 77 are inputted to an inverse γ correction portion 81-1 to an inverse γ correction portion 81-3 of the LCD inverse γ correction portion 52, are subjected to the inverse γ correction by using γ2 establishing γlcd/γ2=1, and are outputted.

The description is returned to FIG. 7. An LCD γ characteristic operation portion 53 carries out they correction for the signal inputted from the LCD inverse γ correction portion 52 by using the γ characteristics of the LCD, outputs a picture signal of a luminance level (X, Y, Z), and causes it to be displayed on a not-shown LCD.

A controller 54 controls the respective portions of the LCD chromaticity conversion device 41, and generates and outputs control signals for controlling the processing executed by the light source chromaticity conversion processing portion 51, the LCD inverse γ correction portion 52, and the LCD γ characteristic operation portion 53.

Besides, a drive 55 is also connected to the controller 54. As the need arises, a magnetic disk 61, an optical disk 62, a magneto-optical disk 63, and a semiconductor memory 64 are mounted on the drive 55, and transfer of data is carried out.

FIG. 9A shows values of chromaticity points of the CRT, and FIG. 9B shows values of chromaticity points of the LCD. When the values of these chromaticity points are substituted for the foregoing expressions (26) to (34) and a calculation is made, the values of the transformation matrix (crt) and the transformation matrix (lcd) can be obtained. Then, by using the foregoing expressions (38) to (46), an inverse matrix of each of the transformation matrix (crt) and the transformation matrix (lcd) can be obtained. The values of the inverse matrix of the transformation matrix (lcd) are shown in expression (60), and the values of the transformation matrix (crt) are shown in expression (61).

[Numerical Formula 25]

$$(lcd)^{-1} = \begin{pmatrix} 3.032 & -1.139 & 0.449 \\ -0.985 & 1.845 & 0.033 \\ 0.023 & 0.043 & 0.767 \end{pmatrix} \quad (60)$$

[Numerical Formula 26]

$$(crt) = \begin{pmatrix} 0.334 & 0.335 & 0.233 \\ 0.182 & 0.713 & 0.105 \\ 0.019 & 0.150 & 1.165 \end{pmatrix} \quad (61)$$

Accordingly, by substituting the expressions (60) and (61) for the expression (59), the values of the chromaticity transformation matrix (n) used in the light source chromaticity conversion processing portion 51 can be obtained.

[Numerical Formula 27]

$$(n) = (lcd)^{-1}(crt) \quad (62)$$
$$= \begin{pmatrix} 0.798 & 0.138 & 0.064 \\ 0.007 & 0.990 & 0.003 \\ 0.014 & 0.092 & 0.894 \end{pmatrix}$$

Then, the inverse γ correction carried out in the LCD inverse γ correction portion 52 and the γ correction carried out in the LCD γ characteristic operation portion 53 are executed such that γ_lcd=γlcd/γ2=1 is established.

Figure 10B:
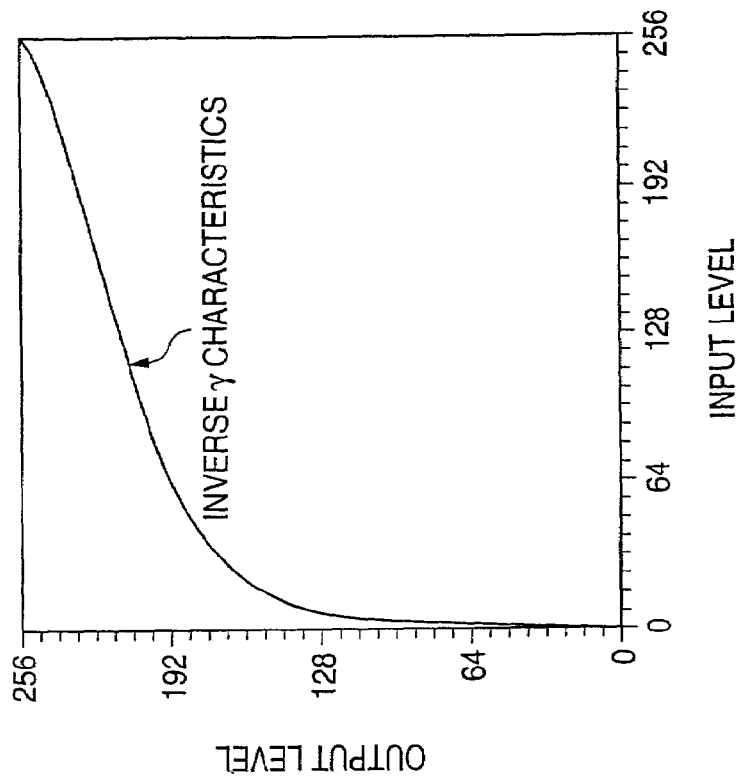
FIGS. 10A and 10B are views for explaining composite γ characteristics, γ characteristics γlcd of an LCD, and inverse γ characteristics in the LCD chromaticity conversion device of FIG. 7.
Figure 10A:
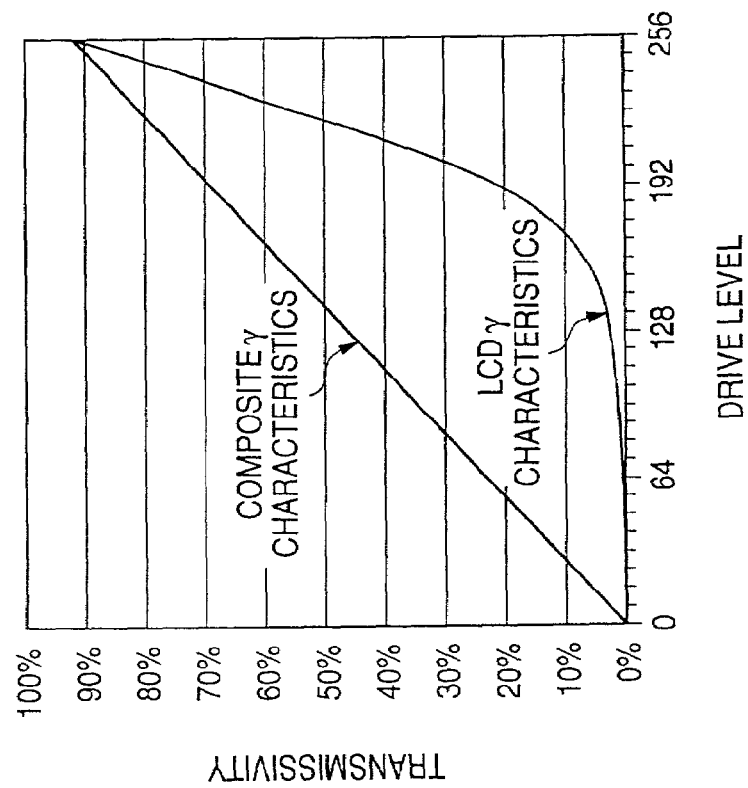

FIG. 10A shows the composite γ characteristics in the LCD chromaticity conversion device 41 of FIG. 7 (that is, the γ characteristics $\gamma_{13}$lcd=1 in the LCD chromaticity conversion device 41 to which the present invention is applied), and the γ characteristics γlcd of the LCD carried out in the LCD γ characteristic operation portion 53. In order to adjust the difference in the gamma characteristics, the inverse γ correction is carried out in the LCD inverse γ correction portion 52. The inverse γ characteristics (1/γ2) in this case are shown in FIG. 10B.

That is, in the LCD chromaticity conversion device 41 of FIG. 7 to which the present invention is applied, the processing of the respective signals is executed so as to achieve CRT compatibility from the viewpoint of the output side (not-shown LCD). When the respective structural elements are considered from the output side contrary to the foregoing description, the nonlinear circuit (the LCD inverse γ correction portion 52, and the LCD γ characteristic operation portion 53) for linearly converting the gradation characteristics of the LCD is provided at the outermost output side. At the input side thereof, the linear matrix circuit of three rows and three columns (the matrix operation portion 51-2 of the light source chromaticity conversion processing portion 51) for converting the chromaticity points of the LCD and the chromaticity points of the CRT is provided. At the outermost input side, the nonlinear circuit (the γ operation portion 51-1 of the light source chromaticity conversion processing portion 51) having the same characteristics as the gradation characteristics of the CRT is provided.

By adopting the structure as stated above, the color reproduction compatible with the CRT display at any signal levels is enabled. Besides, since the chromaticity conversion device of the present invention carries out the linear chromaticity conversion, the circuit can be constructed comparatively simply, so that the cost can be reduced, and further, the same circuit (the signal processing portion 11 explained by using FIG. 4 and FIG. 7) as the conventional signal processing portion for the CRT display can be used for the signal processing portion before the chromaticity conversion, and the development costs can be reduced.

Incidentally, here, although the description has been given of the LCD chromaticity conversion device for enabling the color reproduction compatible with the CRT display in the LCD, the present invention can also be applied to a chromaticity conversion device in a display other than the LCD, which can be compatible with the CRT display.

The foregoing series of processings can also be executed by software. With respect to the software, a program constituting the software is installed on the dedicated hardware of a computer, or the program is installed from a recording medium on, for example, a general purpose personal computer which can execute various functions by installing various programs.

As shown in FIG. 7, different from the computer, this recording medium is constructed by a package medium including a magnetic disk 61 (including a floppy disk), an optical disk (including a CD-ROM (Compact Disk-Read Only Memory) and a DVD (Digital Versatile Disk)), a magneto-optical disk 63 (including an MD (Mini-Disk)), and a semiconductor memory 64, on which the program is recorded and which is distributed to provide a user with the program.

Besides, in the present specification, steps for describing the program recorded on the recording medium naturally include processings performed in time series along the recited sequence, and further include processings which are not always performed in time series but are executed in parallel or individually.

What is claimed is:

1. A chromaticity conversion device that executes chromaticity conversion for displaying image data compatible with a first display portion in color reproduction on a second display portion different from the first display portion in light source chromaticity and gradation characteristics, the chromaticity conversion device comprising:
   first operation means for executing a gradation correction operation by using the gradation characteristics of the first display portion;
   second operation means for executing a linear matrix operation for the chromaticity conversion, the second operation means executing the linear matrix operation by using a matrix product of an inverse matrix of a transformation matrix corresponding to the second display portion and a transformation matrix corresponding to the first display portion; and
   third operation means for executing an operation for linearly converting the gradation characteristics of the second display portion.

2. The chromaticity conversion device according to claim 1, wherein the third operation means comprises:
   first correction means for executing an inverse gamma correction in accordance with first gamma characteristics; and
   second correction means for executing a gamma correction in accordance with second gamma characteristics, wherein
   the second gamma characteristics are gamma characteristics of the second display portion; and
   the first gamma characteristics are determined such that a combination of the inverse gamma correction by the first correction means and the gamma correction by the second correction means is linear.

3. The chromaticity conversion device according to claim 1, wherein the first display portion is a cathode ray tube display and the second display portion is a liquid crystal display.

4. A chromaticity conversion method for a chromaticity conversion device that executes chromaticity conversion for displaying image data compatible with a first display portion in color reproduction on a second display portion different from the first display portion in light source chromaticity and gradation characteristics, the chromaticity conversion method comprising the steps of:
   executing a gradation correction operation by using the gradation characteristics of the first display portion;
   executing a linear matrix operation for the chromaticity conversion, the linear matrix operation being executed by using a matrix product of an inverse matrix of a transformation matrix corresponding to the second display portion and a transformation matrix corresponding to the first display portion; and
   executing an operation for linearly converting the gradation characteristics of the second display portion.

5. A recording medium on which a computer readable program is recorded, the program being for a chromaticity conversion device that executes chromaticity conversion for displaying image data compatible with a first display portion in color reproduction on a second display portion different from the first display portion in light source chromaticity and gradation characteristics, the program comprising the steps of:
   executing a gradation correction operation by using the gradation characteristics of the first display portion;
   executing a linear matrix operation for the chromaticity conversion, the linear matrix operation being executed by using a matrix product of an inverse matrix of a transformation matrix corresponding to the second display portion and a transformation matrix corresponding to the first display portion; and executing an operation for linearly converting the gradation characteristics of the second display portion.

6. A recording medium on which a computer executable program is recorded, the program is operable to control a chromaticity conversion device that executes chromaticity conversion for displaying image data compatible with a first display portion in color reproduction on a second display portion different from the first display portion in light source chromaticity and gradation characteristics, the program comprising the steps of:
   executing a gradation correction operation by using the gradation characteristics of the first display portion;
   executing a linear matrix operation for the chromaticity conversion, the linear matrix operation being executed by using a matrix product of an inverse matrix of a transformation matrix corresponding to the second display portion and a transformation matrix corresponding to the first display portion; and
   executing an operation for linearly converting the gradation characteristics of the second display portion.

7. A display device including a first display portion different from a second display portion in light source chromaticity and gradation characteristics for displaying image data compatible with the second display portion in color reproduction, the display device comprising:
   signal processing means for executing signal processing similar to processing executed when the image data is displayed on the second display portion;
   chromaticity conversion means for executing chromaticity conversion of a signal corresponding to the image data subjected to the signal processing by the signal processing means; and
   display control means for controlling display of the image data converted by the chromaticity conversion means on the first display portion,
   wherein the chromaticity conversion means includes:
   first operation means for executing a gradation correction operation by using the gradation characteristics of the second display portion;
   second operation means for executing a linear matrix operation for the chromaticity conversion, the second operation means executing the linear matrix operation by using a matrix product of an inverse matrix of a transformation matrix corresponding to the first display portion and a transformation matrix corresponding to the second display portion; and
   third operation means for executing an operation for linearly converting the gradation characteristics of the first display portion.

8. The display device according to claim 7, wherein the third operation means comprises:
   first correction means for executing an inverse gamma correction in accordance with first gamma characteristics; and
   second correction means for executing a gamma correction in accordance with second gamma characteristics, wherein
   the second gamma characteristics are gamma characteristics of the first display portion; and
   the first gamma characteristics are determined such that a combination of the inverse gamma correction by the first correction means and the gamma correction by the second correction means is linear.

9. The display device according to claim 7, wherein the first display portion is a liquid crystal display and the second display portion is a cathode ray tube display.

10. A display method of a display device comprising a first display portion different from a second display portion in light, source chromaticity and gradation characteristics for displaying image data compatible with the second display portion in color reproduction, the display method comprising the steps of:
    executing signal processing similar to processing executed when the image data is displayed on the second display portion;
    executing chromaticity conversion of a signal corresponding to the image data subjected to the signal processing in the signal processing step; and
    controlling a display of the image data converted by the processing of the chromaticity conversion step on the first display portion,
    wherein the chromaticity conversion step includes the steps of:
    executing an operation of a gradation correction by using the gradation characteristics of the second display portion;
    executing a linear matrix operation for the chromaticity conversion, the linear matrix operation is executed by using a matrix product of an inverse matrix of a transformation matrix corresponding to the second display portion and a transformation matrix corresponding to the first display portion; and
    executing an operation for linearly converting the gradation characteristics of the first display portion.

11. A recording medium on which a computer readable program is recorded, the program being for a display device comprising a first display portion different from a second display portion in light source chromaticity and gradation characteristics for displaying image data compatible with the second display portion in color reproduction, the program comprising the steps of:
    executing signal processing similar to processing executed when the image data is displayed on the second display portion;
    executing chromaticity conversion of a signal corresponding to the image data subjected to the signal processing in the signal processing step; and
    controlling display of the image data converted by the processing of the chromaticity conversion step on the first display portion,
    wherein the chromaticity conversion step includes the steps of:
    executing a gradation correction operation by using the gradation characteristics of the second display portion;
    executing a linear matrix operation for the chromaticity conversion, the linear matrix operation being executed by using a matrix product of an inverse matrix of a transformation matrix corresponding to the second display portion and a transformation matrix corresponding to the first display portion; and
    executing an operation for linearly converting the gradation characteristics of the first display portion.

12. A recording medium on which a computer executable program is recorded, the program is operable to control a display device comprising a first display portion different from a second display portion in light source chromaticity and gradation characteristics for displaying image data compatible with the second display portion in color reproduction, the program comprising the steps of:
    executing signal processing similar to processing executed when the image data is displayed on the second display portion;

executing chromaticity conversion of a signal corresponding to the image data subjected to the signal processing in the signal processing step; and controlling display of the image data converted by the processing of the chromaticity conversion step on the first display portion, wherein the chromaticity conversion step includes the steps of:

executing a gradation correction operation by using the gradation characteristics of the second display portion;

executing a linear matrix operation for the chromaticity conversion, the linear matrix operation being executed by using a matrix product of an inverse matrix of a transformation matrix corresponding to the second display portion and a transformation matrix corresponding to the first display portion; and executing an operation for linearly converting the gradation characteristics of the first display portion.

* * * * *

UNITED STATES PATENT AND TRADEMARK OFFICE
CERTIFICATE OF CORRECTION

| | | |
|---|---|---|
| PATENT NO. | : 7,088,478 B2 | Page 1 of 1 |
| APPLICATION NO. | : 10/059794 | |
| DATED | : August 8, 2006 | |
| INVENTOR(S) | : Yoshiki Shirochi and Hiroaki Endo | |

It is certified that error appears in the above-identified patent and that said Letters Patent is hereby corrected as shown below:

Column 7, line 29, "they" should read --the $\gamma$--.
Column 7, line 41, "is shown" should read --are shown--.
Column 12, line 2, "they" should read --the $\gamma$--.
Column 12, line 65, "$\gamma_{13}$lcd=1" should read --$\gamma\_$lcd=1--.
Column 16, line 3, "light, source" should read --light source--.

Signed and Sealed this

Twenty-seventh Day of March, 2007

JON W. DUDAS
*Director of the United States Patent and Trademark Office*